United States Patent
Morishima

(10) Patent No.: US 7,646,691 B2
(45) Date of Patent: Jan. 12, 2010

(54) OPTICAL DISK FACE DISCRIMINATING SYSTEM AND OPTICAL DISK DRIVE

(75) Inventor: Morito Morishima, Shizuoka-ken (JP)

(73) Assignee: Yamaha Corporation, Shizuoka-Ken (JP)

(*) Notice: Subject to any disclaimer, the term of this patent is extended or adjusted under 35 U.S.C. 154(b) by 649 days.

(21) Appl. No.: 10/744,644

(22) Filed: Dec. 23, 2003

(65) Prior Publication Data

US 2004/0224041 A1 Nov. 11, 2004

(30) Foreign Application Priority Data

Dec. 26, 2002 (JP) ............... 2002-377879

(51) Int. Cl.
*G11B 7/00* (2006.01)
(52) U.S. Cl. .................... 369/53.23; 347/224
(58) Field of Classification Search ........... None
See application file for complete search history.

(56) References Cited

U.S. PATENT DOCUMENTS

| | | | | |
|---|---|---|---|---|
| 5,381,392 | A * | 1/1995 | Hira | 369/53.23 |
| 6,272,087 | B1 * | 8/2001 | Hirashima | 369/53.22 |
| 6,370,093 | B1 * | 4/2002 | Tada et al. | 369/44.25 |
| 6,633,523 | B1 | 10/2003 | Masaki et al. | |
| 6,775,221 | B1 * | 8/2004 | Fukumoto | 369/112.16 |
| 2002/0191517 | A1 * | 12/2002 | Honda et al. | 369/53.29 |
| 2003/0193864 | A1 * | 10/2003 | Pate et al. | 369/47.51 |
| 2006/0151605 | A1 * | 7/2006 | Miyoshi et al. | 235/454 |

FOREIGN PATENT DOCUMENTS

| | | |
|---|---|---|
| JP | 61-085631 | 5/1986 |
| JP | 63-153731 | 6/1988 |
| JP | 09-035402 | 2/1997 |
| JP | 09-245417 | 9/1997 |
| JP | 09-293321 | 11/1997 |
| JP | 09-312022 | 12/1997 |
| JP | 2000-293862 | 10/2000 |
| JP | 2002-230793 | 8/2002 |
| JP | 2002-324380 | 8/2002 |
| JP | 2002-324380 | 11/2002 |

* cited by examiner

Primary Examiner—Joseph H Feild
Assistant Examiner—Joseph Haley
(74) Attorney, Agent, or Firm—Harness, Dickey & Pierce, PLC

(57) ABSTRACT

An S-curve discriminating portion discriminates that a recording face of an optical disk is opposed to a pickup when a normal S-curve appears in a waveform of a focus error signal Fe that appears when an objective lens fluctuates vertically, while discriminates that a label face is opposed when the waveform of the focus error signal is distorted and two S-curves with large and small magnitudes appear. A signal indicating this discriminated result is supplied to a control portion for controlling respective portions of an optical disk drive.

13 Claims, 12 Drawing Sheets

OPTICAL DISK FACE DISCRIMINATING SYSTEM AND OPTICAL DISK DRIVE

BACKGROUND OF THE INVENTION

The present invention relates to an optical disk face discriminating system for discriminating which one of a recording face and a label face of an optical disk is set to oppose to a pickup, and an optical disk drive for forming an image on the label face.

The data recording onto the optical disk such as CD-R (Compact Disc-Recordable), CD-RW (Compact Disc-Rewritable), or the like is executed by irradiating a laser beam onto the recording face by the pickup. Therefore, a process of discriminating whether or not the optical disk is set in such a situation that the recording face opposes to the pickup is carried out before the data recording.

In this case, there is the technology to discriminate the type of disk such as a CD system, a DVD (Digital Versatile Disk) system, or the like simultaneously with such discriminating process (see Patent JP-A-2002-230793, for example).

Meanwhile, the inventors of this application have proposed the technology of providing the discolored layer, which is discolored by the heat or light, on the label face formed on the opposite side to the recording face integrally with the optical disk, and then forming an image, which is used to discriminate the data recorded on the recording face, on the label face by irradiating the laser beam onto the discolored layer to discolor it. In this case, this technology is not disclosed at the filing time of this application yet and does not constitute a prior art.

However, if the label face having the discolored layer thereon is discriminated, first it is discriminated resultantly that the recording face is not set to oppose to the pickup. However, according to such discriminated result, it is impossible to distinguish a situation in which the label face is set truly to oppose to the pickup from a situation in which, though simply the recording face is opposed to the pickup, the dust, the scratch, or the like on such recording face is incorrectly discriminated as the discolored layer.

Here, based on such a discriminated result that the recording face is not set to oppose to the pickup, if it is decided indirectly that the label face is opposed to the pickup, the laser beam is irradiated in error onto the recording face side, although the user intends to irradiate the laser beam onto the discolored layer so as to form the image. As a result, in the case that the data have already recorded on the recording face, there is such a disadvantage that the recorded data (pit) may be destroyed if the laser beam is irradiated again onto the recording face.

Therefore, in the case that the optical disk on the recording face of which the data are to be recorded and on the label face of which the image is to be formed respectively is employed, the technology of not only discriminating merely whether or not the recording face is opposed to the pickup but also discriminating directly whether or not the label face is opposed to the pickup is requested.

SUMMARY OF THE INVENTION

The present invention has been made in view of the above circumstances, and it is an object of the present invention to provide an optical disk face discriminating system capable of precisely and directly discriminating which one of a recording face, on which data can be recorded, and a label face, on which an image can be formed, of an optical disk is opposed to a pickup, and an optical disk drive capable of forming an image on the label face when it is discriminated that the label face is opposed to the pickup.

In order to solve the aforesaid object, the invention is characterized by having the following arrangement.

(1) An optical disc apparatus that recognizes a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surface of the recording side and the label side;

a focusing unit which drives an objective lens along the optical axis for focusing the laser beam at a focal point;

a focus searching unit which control the focusing unit so that the focal point moves up and down in a predetermined range;

an error signal outputting unit which outputs a focus error signal indicating in which direction and to what extent the focal point is deviated from the reflective layer of the optical disk; and a discriminating unit which acquires a waveform of the focus error signal that appears when the focal point of the laser beam passes through the reflective layer due to up and down motion of the focal point, and recognize whether the waveform corresponds to a waveform that is acquired in a case when the recording side faces toward the irradiating unit or corresponds to a waveform that is acquired in a case when the label side faces toward the irradiating unit.

(2) The apparatus according to claim 1, wherein, after an irradiation spot of the laser beam is moved to an area in which the reflective layer is formed but no groove is formed, the focus searching unit controls the focusing unit.

(3) An optical disk apparatus that recognize a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surfaces of the recording side and the label side;

a focusing unit which drives an objective lens along the optical axis for focusing the laser beam at a focal point;

a focus searching unit which control the focusing unit so that the focal point moves up and down in a predetermined range;

a sensing unit which senses return light, which is reflected by the reflective layer, among the laser beam applied by the irradiating unit; and a discriminating unit which acquires a waveform of a signal indicating an amount of the return light that appears when the focal point of the laser beam passes through the reflective layer due to up and down motion of the focal point, and recognizes whether the waveform corresponds to a waveform that is acquired in a case when the recording side faces toward the irradiating unit or corresponds to a waveform that is acquired in a case when the label side faces toward the irradiating unit.

(4) The apparatus according to claim 3, wherein, after an irradiation spot of the laser beam is moved to an area in which the reflective layer is formed but no groove is formed, the focus searching unit controls the focusing unit.

(5) An optical disk apparatus that recognizes a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surfaces of the recording side or the label side;

a focusing unit which drives an objective lens along the optical axis for focusing the laser beam at a focal point;

a focus controlling unit which controls the focusing unit so that the focal point has a predetermined relationship with the reflective layer; and a discriminating unit which recognizes that the recording side of the optical disk is set opposite to the irradiating unit if a time average position of the objective lens controlled by the focus controlling unit is positioned closer to the optical disk than a predetermined threshold position, and recognizes the label side of the optical disk is set opposite to the irradiating unit if the time average position of the objective lens is not closer to the optical disk tan the predetermined threshold.

(6) An optical disk apparatus that recognizes a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surfaces of the recording side or the label side;

a sensing unit which senses return light, which is reflected by the reflective layer, among the laser beam applied by the irradiating unit; and a discriminating unit which recognize, when the irradiating unit irradiates, with the laser beam, the one of surfaces at a predetermined intensity, whether an intensity characteristic of the return light corresponds to an intensity characteristic of the recording side or corresponds to an intensity characteristic of the label side.

(7) An optical disc apparatus that recognizes a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surface of the recording side and the label side;

a focusing unit which drives an objective lens along the optical axis for focusing the laser beam at a focal point;

a focus searching unit which control the focusing unit so that the focal point moves up and down in a predetermined range;

an error signal outputting unit which outputs a focus error signal indicating in which direction and to what extent the focal point is deviated from the reflective layer of the optical disk;

a focus controlling unit which controls the focusing unit so that the focal point has a predetermined relationship with the reflective layer;

a first discriminating unit which acquires a waveform of the focus error signal that appears when the focal point of the laser beam passes through the reflective layer due to up and down motion of the focal point, and recognize whether the waveform corresponds to a waveform that is acquired in a case when the recording side faces toward the irradiating unit or corresponds to a waveform that is acquired in a case when the label side faces toward the irradiating unit; and a second discriminating unit which recognizes that the recording side of the optical disk is set opposite to the irradiating unit if a time average position of the objective lens controlled by the focus controlling unit is positioned closer to the optical disk than a predetermined threshold position, and recognizes the label side of the optical disk is set opposite to the irradiating unit if the time average position of the objective lens is not closer to the optical disk tan the predetermined threshold, wherein, when the first discriminating unit recognizes that label side faces toward the irradiating unit and thereafter the second discriminating unit recognizes again that the label side faces toward the irradiating unit, the discolorable layer is irradiated with the laser beam at a intensity according to a dot of an image to be formed on the discolorable layer.

(8) An optical disc apparatus that recognizes a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surface of the recording side and the label side;

a focusing unit which drives an objective lens along the optical axis for focusing the laser beam at a focal point;

a focus searching unit which control the focusing unit so that the focal point moves up and down in a predetermined range;

an error signal outputting unit which outputs a focus error signal indicating in which direction and to what extent the focal point is deviated from the reflective layer of the optical disk;

a sensing unit which senses return light, which is reflected by the reflective layer, among the laser beam applied by the irradiating unit; and a first discriminating unit which acquires a waveform of the focus error signal that appears when the focal point of the laser beam passes through the reflective layer due to up and down motion of the focal point, and recognize whether the waveform corresponds to a waveform that is acquired in a case when the recording side faces toward the irradiating unit or corresponds to a waveform that is acquired in a case when the label side faces toward the irradiating unit;

a second discriminating unit which recognize, when the irradiating unit irradiates, with the laser beam, the one of surfaces at a predetermined intensity, whether an intensity characteristic of the return light corresponds to an intensity characteristic of the recording side or corresponds to an intensity characteristic of the label side, wherein, when the first discriminating unit recognizes that label side faces toward the irradiating unit and thereafter the second discriminating unit recognizes again that the label side faces toward the irradiating unit, the discolorable layer is irradiated with the laser beam at a intensity according to a dot of an image to be formed on the discolorable layer.

(9) An optical disk apparatus that recognize a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surfaces of the recording side and the label side;

a focusing unit which drives an objective lens along the optical axis for focusing the laser beam at a focal point;

a focus searching unit which control the focusing unit so that the focal point moves up and down in a predetermined range;

a sensing unit which senses return light, which is reflected by the reflective layer, among the laser beam applied by the irradiating unit;

a focus controlling unit which controls the focusing unit so that the focal point has a predetermined relationship with the reflective layer;

a first discriminating unit which acquires a waveform of a signal indicating an amount of the return light that appears when the focal point of the laser beam passes through the reflective layer due to up and down motion of the focal point, and recognizes whether the waveform corresponds to a waveform that is acquired in a case when the recording side faces toward the irradiating unit or corresponds to a waveform that is acquired in a case when the label side faces toward the irradiating unit; and a second discriminating unit which recognizes that the recording side of the optical disk is set opposite to the irradiating unit if a time average position of the objective lens controlled by the focus controlling unit is positioned closer to the optical disk than a predetermined threshold position, and recognizes the label side of the optical disk is set opposite to the irradiating unit if the time average position of the objective lens is not closer to the optical disk tan the predetermined threshold, wherein, when the first discriminating unit recognizes that label side faces toward the irradiating unit and thereafter the second discriminating unit recognizes again that the label side faces toward the irradiating unit, the discolorable layer is irradiated with the laser beam at a intensity according to a dot of an image to be formed on the discolorable layer.

(10) An optical disk apparatus that recognize a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surfaces of the recording side and the label side;

a focusing unit which drives an objective lens along the optical axis for focusing the laser beam at a focal point;

a focus searching unit which control the focusing unit so that the focal point moves up and down in a predetermined range;

a sensing unit which senses return light, which is reflected by the reflective layer, among the laser beam applied by the irradiating unit;

a first discriminating unit which acquires a waveform or a signal indicating an amount of the return light that appears when the focal point of the laser beam passes through the reflective layer due to up and down motion of the focal point, and recognizes whether the waveform corresponds to a waveform that is acquired in a case when the recording side faces toward the irradiating unit or corresponds to a waveform that is acquired in a case when the label side faces toward the irradiating unit; and a second discriminating unit which recognize, when the irradiating unit irradiates, with the laser beam, the one of surfaces at a predetermined intensity, whether an intensity characteristic of the return light corresponds to an intensity characteristic of the recording side or corresponds to an intensity characteristic of the label side.

DETAILED DESCRIPTION OF PREFERRED EMBODIMENTS

Embodiments of the present invention will be explained with reference to the drawings hereinafter.

First Embodiment

Figure 1:
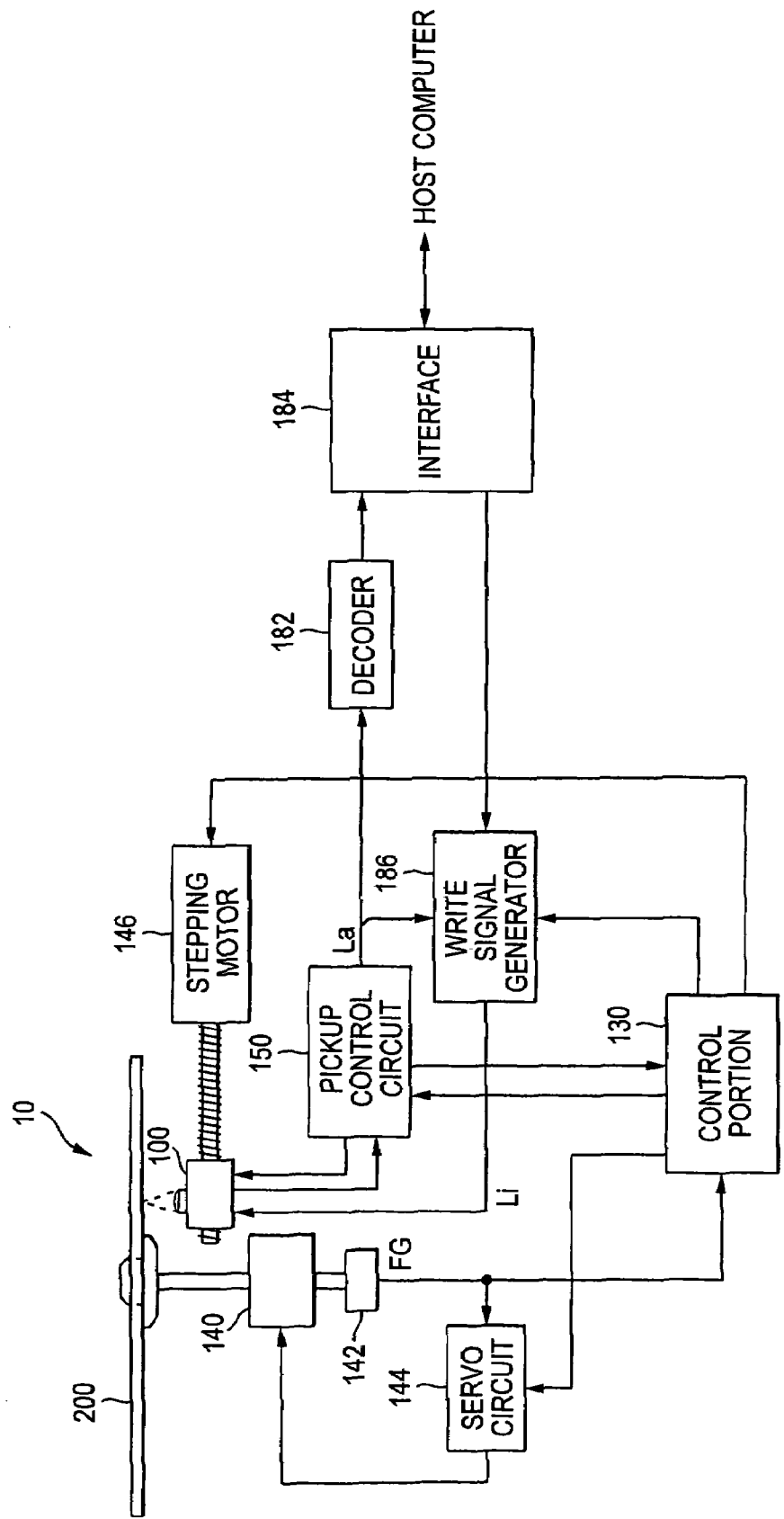
FIG. 1 is a block diagram showing a configuration of an optical disk drive according to a first embodiment of the present invention.

First, a configuration of an optical disk drive according to a first embodiment of the present invention will be explained hereunder. FIG. 1 is a block diagram showing a configuration of this optical disk drive 10. In addition to a normal data recording function of recording data on the recording face of an optical disk 200, an image forming function of forming an image on the label face is added to this optical disk drive 10.

In FIG. 1, a control portion 130 controls respective portions of the optical disk drive 10. A spindle motor 140 rotates the optical disk 200. A rotation sensor 142 is a frequency tachogenerator of such a type that outputs a signal FG, whose frequency responds to a rotational speed of the spindle, by utilizing a counter-electromotive force of the spindle motor 140.

This optical disk drive 10 is constructed to record the data or form the image on the basis of the CAV (Constant Angular Velocity) system. Therefore, a servo circuit 144 feedback-controls the spindle motor 140 such that the actual rotational speed indicated by the signal FG coincides with a target value instructed by the control portion 130.

A pickup 100 is a block that irradiates the optical disk 200 with the laser beam and receives a returned light. A pickup control circuit 150 outputs a light quantity signal La indicating a quantity of returned light of the laser beam, and controls the focus, the tracking, etc. in the pickup 100. In this case, details of the pickup 100 and the pickup control circuit 150 will be descried later.

A stepping motor 146 rotates in compliance with the instruction issued by the control portion 130 and moves the pickup 100, which is screwed to its rotation shaft, in the diameter direction of the optical disk 200.

The light quantity signal La is EFM (Eight to Fourteen Modulation)-modulated in reproducing the recorded data. Therefore, a decoder 182 EFM-demodulates this modulated signal and then supplies the demodulated signal to a host computer via an interface (I/F) 184.

While, a write signal generator 186 controls a current value of a driving signal Li to the laser such that a quantity of returned light indicated by the light quantity signal La (a quantity of returned light, which is reflected by a reflecting layer 203, out of the actually irradiated laser beam) coincides with a target value that is necessary for the data recording or the image formation.

Here, the target value necessary for the data recording is the value obtained by applying the EFM-modulation to the recorded data, which are supplied from the host computer via the interface 184, and then applying the time-base correcting process, etc. to the EFM signal, and this value is enough to form the pit. In contrast, the target value necessary for the image formation is the value that responds to a density of dots to be formed on the optical disk 200, out of the formed data supplied from the host computer via the interface 184.

In the present embodiment, since the CAV system with a constant angular velocity is employed as described above, a line velocity is increased toward the outer periphery side of the optical disk 200. Therefore, the control portion 130 sets the higher target value as the pickup 100 is positioned at the outer side of the optical disk 200.

In this manner, an intensity of the laser beam irradiated by the pickup 100 is controlled by feed-backing an actual quantity of irradiated light indicated by the light quantity signal La so that the intensity coincides with the target value.

<Pickup and its Periphery>

Figure 2:
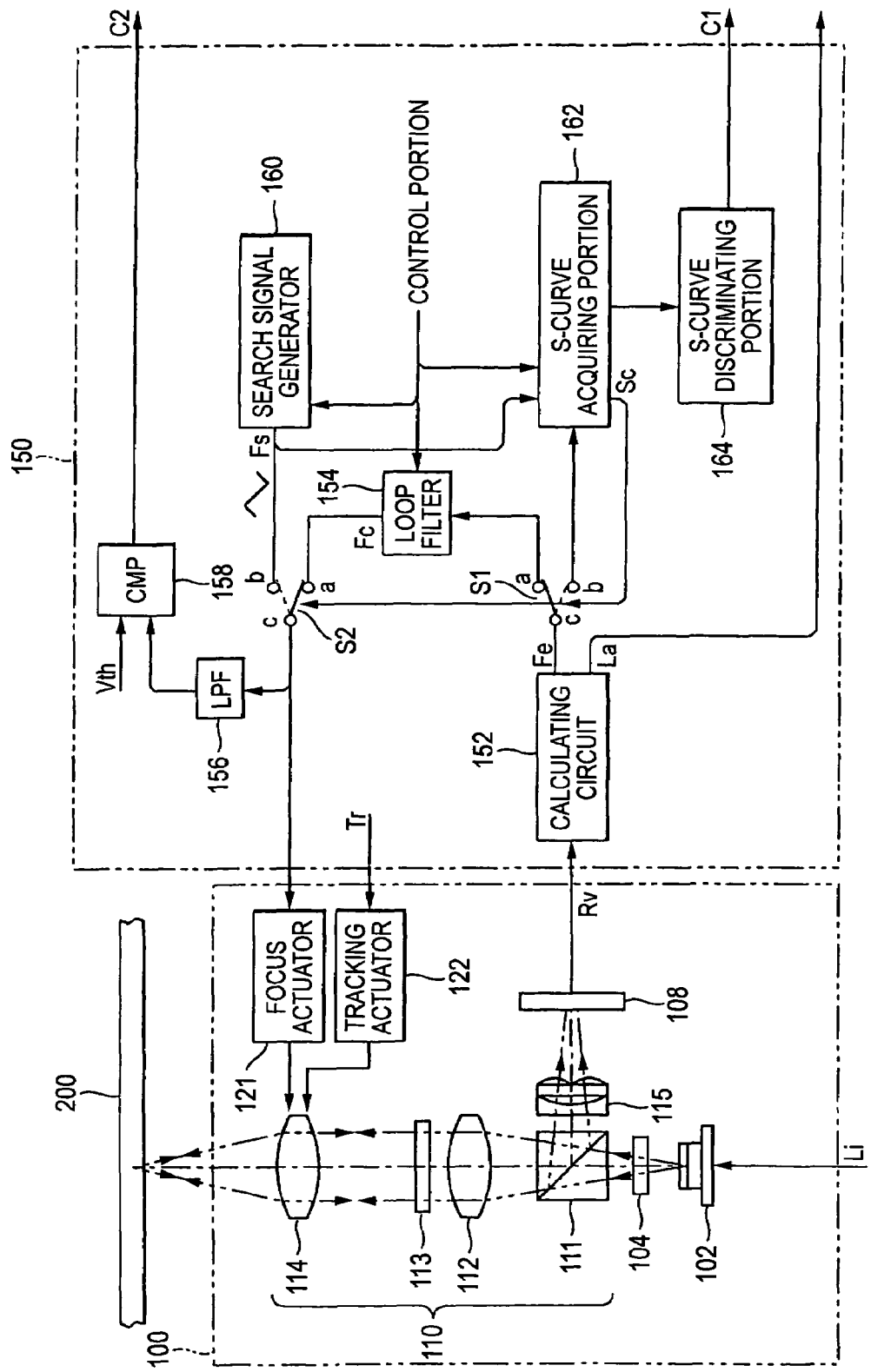
FIG. 2 is a block diagram showing a configuration of a pickup in the optical disk drive.

Next, details of the pickup 100 and the pickup control circuit 150 will be explained with reference to FIG. 2 hereunder. As shown in FIG. 2, the pickup 100 includes mainly a laser diode 102 for emitting the laser beam, a diffracting grating 104, an optical system 110 for converging the laser beam onto the optical disk 200, and a light receiving element 108 for receiving a reflected (returned) light.

The laser diode 102 is driven by the driving signal Li and emits the laser beam whose intensity responds to its current value. The laser beam emitted from the laser diode 102 is separated into a main beam and two sub beams by the diffracting grating 104, then passed through sequentially a polarization beam splitter 111, a collimator lens 112, a ¼ wavelength plate 113, and an objective lens 114, which constitute the optical system 110, and then converged into the optical disk 200 respectively.

Here, the objective lens 114 is held by a focus actuator 121 and a tracking actuator 122. The focus actuator 121 operates the objective lens 114 to bring it gradually closer to the optical disk 200 as a voltage of a focus driving signal Fc or a triangular wave signal Fs is increased higher. The tracking actuator 122 operates the objective lens 114 in the diameter direction of the optical disk 200 in response to a tracking signal Tr.

Meanwhile, the laser beam reflected by the optical disk 200 is passed through sequentially the objective lens 114, the ¼ wavelength plate 113, and the collimator lens 112 again, then reflected by the polarization beam splitter 111 in a right angle direction, and then incident on the light receiving element 108 via a cylindrical lens 115.

Figure 3:
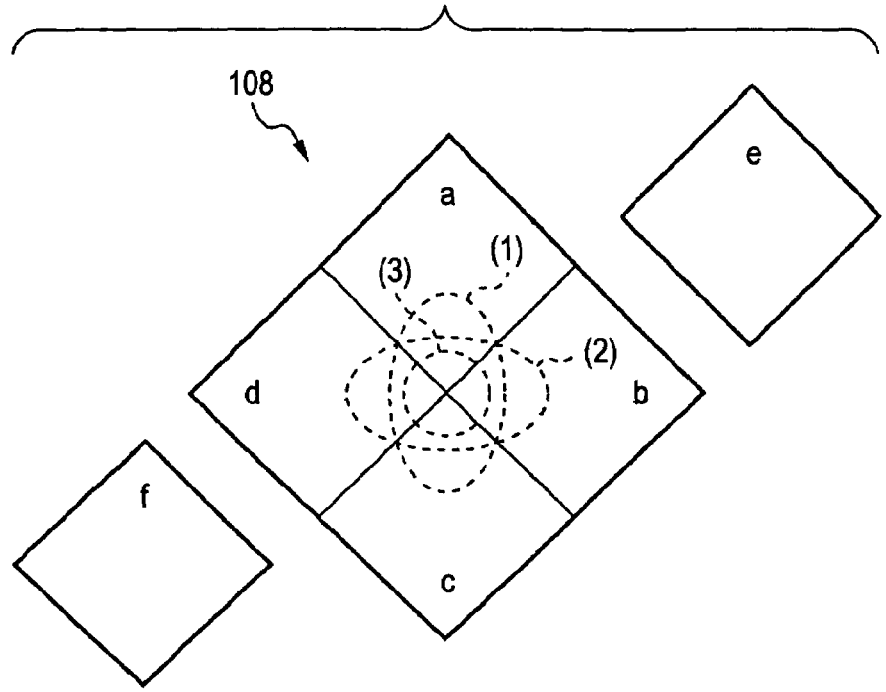
FIG. 3 is a plan view showing a sensing surface of a light receiving element in the pickup.

A sensing area of the light receiving element 108 is split into six areas a to f, as shown in FIG. 3. The areas a to d receive the main beam, the area e receives one of the sub-beams, and the area f receives the other of the sub-beams. These areas output (a signal indicating) an intensity of the received light every area respectively. Therefore, a light receiving signal Rv is given as a general term of intensities of these received lights.

A calculation circuit 152 calculates (b+d)+(a+c) of the intensities of these received lights in the areas a to d, and then outputs the signal La indicating the calculated result. Further, the calculation circuit 152 calculates (b+d)−(a+c), and then outputs the signal Fe indicating the calculated result.

Here, since a quantity of light of the main beam returned from the optical disk 200 is given by a sum of quantities of lights in the areas a to d, the signal La is employed as a light quantity signal.

Further, an image of the main beam formed on the light receiving element 108 by the cylindrical lens 115 becomes a vertical ellipse ① when the objective lens 114 is positioned close to the optical disk 200, becomes a lateral ellipse ② when the objective lens 114 is positioned far from the optical disk 200, and becomes a circle ③ when the objective lens 114 is positioned properly with respect to the optical disk 200 (when a focusing spot of the laser beam is substantially positioned at the reflecting layer 203 of the optical disk). Therefore, a polarity of the signal Fe becomes minus when the objective lens 114 is positioned too close to the optical disk 200, while a polarity of the signal Fe becomes plus when the objective lens 114 is positioned too far from the optical disk 200. In both cases, the absolute value corresponds to an amount of displacement from the proper condition. For this reason, the signal Fe serves as a focus error signal indicating in which direction and to what extent the focusing spot of the laser beam is deviated from a proper value.

Then, a loop filter 154 generates a signal with a polarity that is opposite to that of the focus error signal Fe supplied via a switch S1, then adds an offset voltage to this signal, and then supplies the focus driving signal Fc to the focus actuator 121 via a switch S2. Therefore, since the focus actuator 121 operates the objective lens 114 in the optical axis direction to cancel a focus error, a spot size of the main beam is controlled constantly even when the optical disk 200 is rotated in a rolling state (focus control)

In this case, the characteristic that is required of the focus control becomes different when the recording face of the optical disk 200 is opposed to the pickup 100 and when the label face thereof is opposed to the pickup 100. Therefore, the loop filter 154 is constructed such that servo parameters such as the gain characteristic, the frequency characteristic, etc. are changed with any of parameters specialized in the recording face application or parameters specialized in the label face application, according to the instruction issued from the control portion 130 and changed parameters are set.

The interlocking switches S1, S2 are a double-throw switch that is closed between a-c as indicated by a solid line in FIG. 2 when a selection signal Sc output from an S-curve acquiring portion 162 described later is at a H level, for example, and is closed between b-c as indicated by a broken line in FIG. 2 when the selection signal Sc is at an L level.

Figure 8:
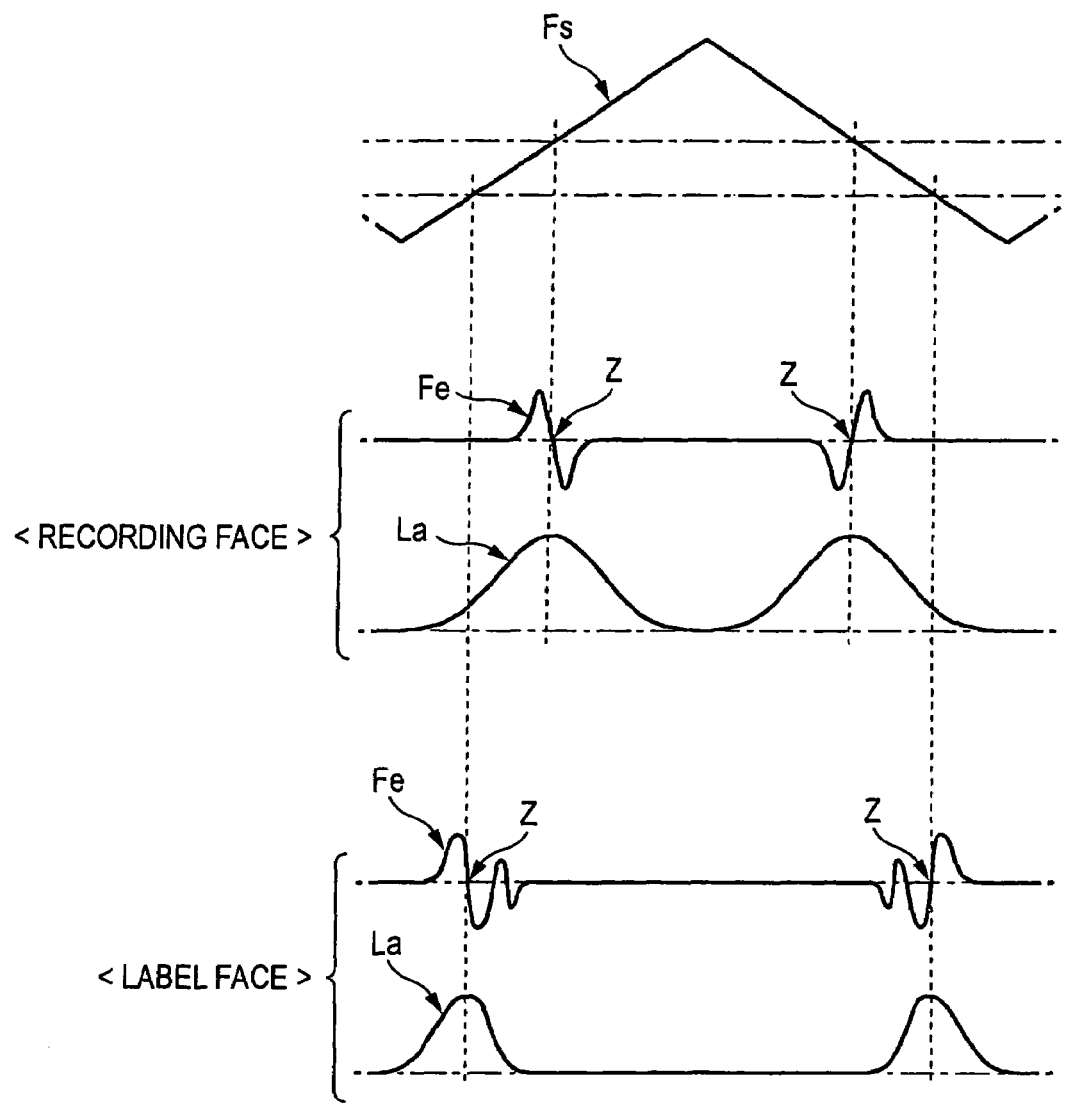
FIG. 8 is a view explaining waveforms of a triangular wave signal Fs, a focus error signal Fe, and a light quantity signal La.

A search signal generator 160 executes a focus search prior to the above focus control, and generates the triangular wave signal Fs as shown in FIG. 8, for example, according to the instruction issued by the control portion 130. Therefore, in the event that the triangular wave signal Fs is supplied to the focus actuator 121, the objective lens 114 moves up and down in response to the voltage in such a way that such objective lens 114 comes closest to the optical disk 200 when a voltage of the triangular wave signal Fs arrives at a maximum peak point whereas such objective lens 114 becomes most distant from the optical disk 200 when the voltage of the triangular wave signal Fs arrives at a minimum bottom point.

The S-curve acquiring portion 162 causes the interlocking switches S1, S2 to close a path b-c respectively in response to the instruction issued by the control portion 130, and acquires an S curve of the focus error signal Fe. In addition, the S-curve acquiring portion 162 causes the interlocking switches S1, S2 to close a path a-c respectively to form a feed-back loop for the focus control when the focus error signal Fe crosses the zero again in the subsequent S curve.

An S-curve discriminating portion 164 discriminates based on a profile of the S curve acquired by the S-curve acquiring portion 162 whether the recording face of the optical disk 200 is opposed to the pickup 100 or the label face thereof is opposed to the pickup 100, and supplies a signal C1 indicating the discriminated result to the control portion 130. In this case, details of this discrimination will be described later.

Meanwhile, a low-pass filter (LPF) 156 smoothes the voltage of the focus driving signal Fc when the interlocking switches S1, S2 are closed between a-c respectively. A comparator (CMP) 158 compares a smoothed voltage of the focus driving signal Fc with a threshold voltage Vth, and then supplies a signal C2, which is at a H level when the former exceeds the latter and is at an L level in remaining cases, to the control portion 130.

<Optical Disk>

Figure 4:
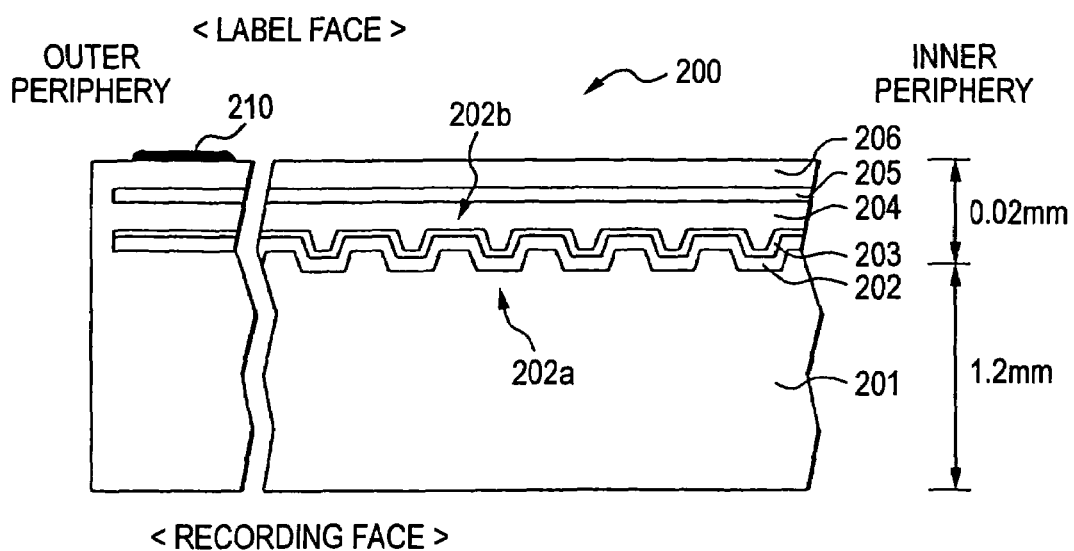
FIG. 4 is a schematic sectional view showing a configuration of the optical disk on which data are recorded or an image is formed by the optical disk drive.

Next, the optical disk 200 in which the data can be recorded on the recording face and the image can be formed on the label face will be explained hereunder. FIG. 4 is a schematic sectional view showing a configuration of this optical disk 200.

As shown in FIG. 4, when viewed from the recording face, the optical disk 200 has a configuration in which a protection layer 201, a recording layer 202, the reflecting layer 203, a protection layer 204, a discolored layer 205, and a protection layer 206 are laminated in this order. In this case, FIG. 4 is depicted merely to explain the configuration of the optical disk 200, and dimensional ratios of respective layers are not always given as shown.

Figure 5:
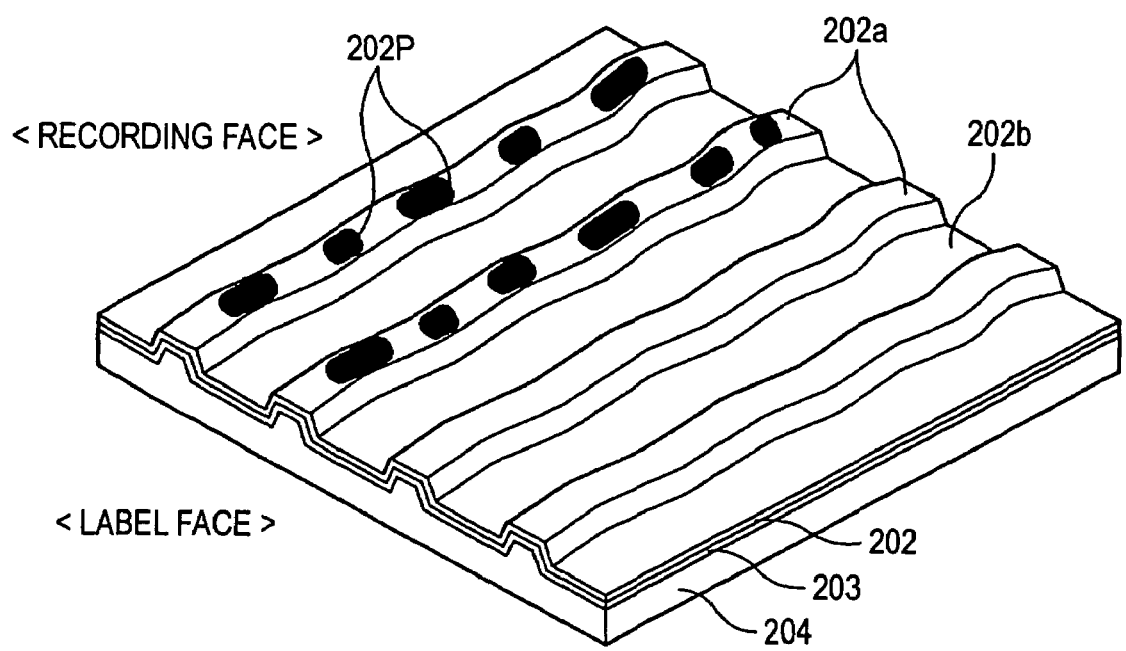
FIG. 5 is a perspective view showing a configuration of a groove in the optical disk.

Out of these layers, spiral grooves 202a are formed on the recording layer 202. In addition, when finely observed, the grooves 202a are wobbled as shown in FIG. 5. Then, time information (ATIP information: Absolute Time In Pregroove) can be derived by demodulating this wobbling. In this case, FIG. 5 is a perspective view in which arrangement in FIG. 4 is turned upside down and from which illustration of the protection layer 201 is omitted, to understand the explanation.

Figure 6:
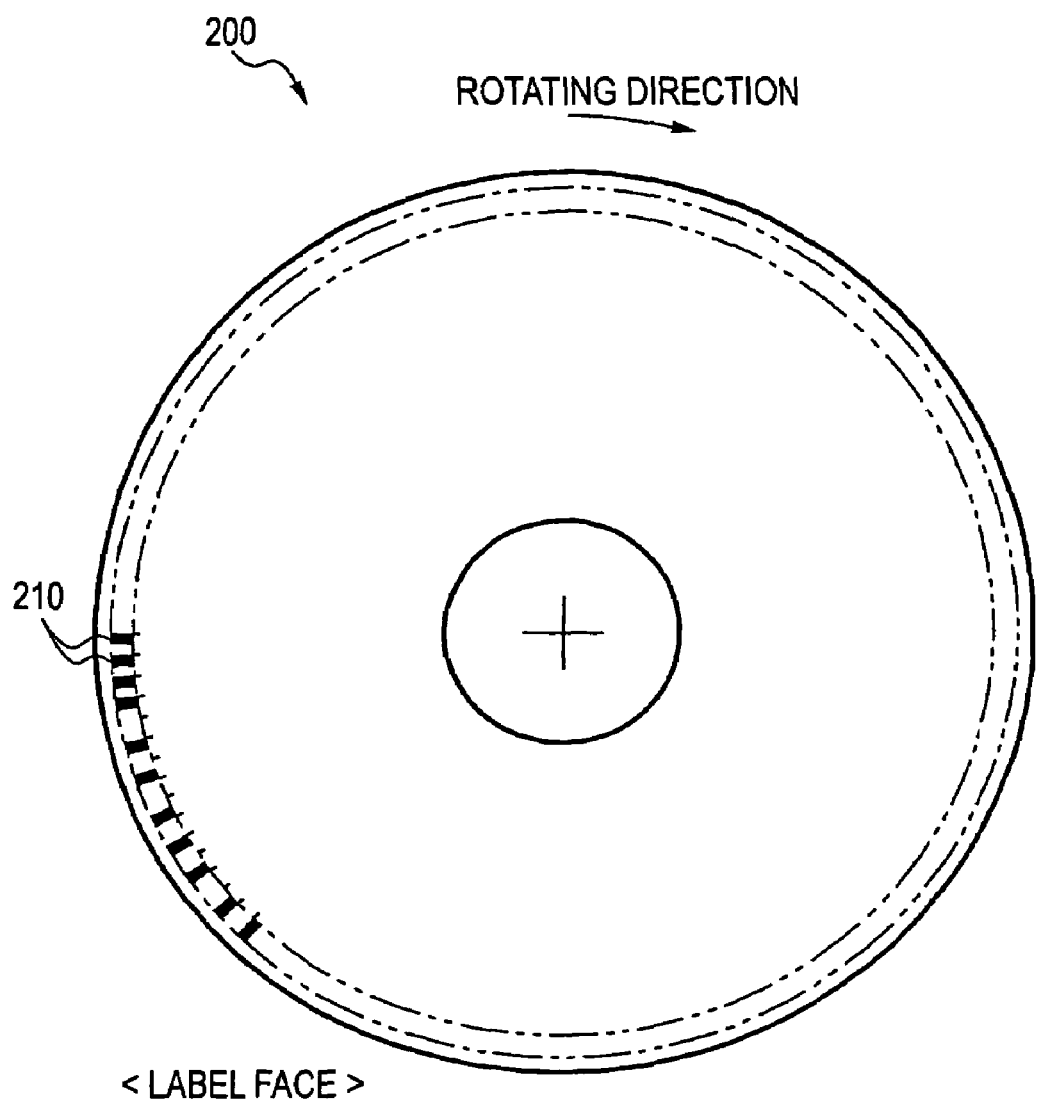
FIG. 6 is a plan view showing the optical disk viewed from a label face.

The discolored layer 205 in FIG. 4 is a layer that is discolored by the heat or light when the laser beam whose intensity is in excess of a predetermined level is applied thereon. A bar code consisting of a plurality of bars 210 is formed on an outer peripheral area of the surface on the label face side of the optical disk 200. In more detail, the bars 210 are provides, as shown in FIG. 6, in the outer peripheral area of the label face, in which the grooves 202a are not provided and the reflecting layer 203 is present. In this case, the bars 210 are formed by the simple approach such as the screen printing, and information indicating that this formation face is the label face, parameters necessary for the image formation, etc. are coded thereon.

Here, when the laser beam is applied to the recording face in FIG. 4 and a spot center of the main beam is positioned at a center of the groove 202a, one of spots of the sub-beams is positioned on the inner side surface of the groove and the other thereof is positioned on the outer side surface of the groove (not shown), and one of returned lights at that time is received in the area e of the light receiving element 108 and the other thereof is received in the area f of the light receiving element 108. Therefore, when the calculation circuit 152 calculates (e-f) of the intensity of received lights in the areas e, f, a resultant signal can be used as a tracking error signal indicating to which side of the inner side/the outer side the main beam is displaced from the target groove 202a and its displacement amount. As a consequence, if the tracking signal Tr to cancel a displacement amount indicated by this tracking error signal is generated to drive the tracking actuator 122, it is possible to cause the main beam to trace exactly the groove 202a during the rotation of the optical disk 200.

<Operation>

Figure 7:
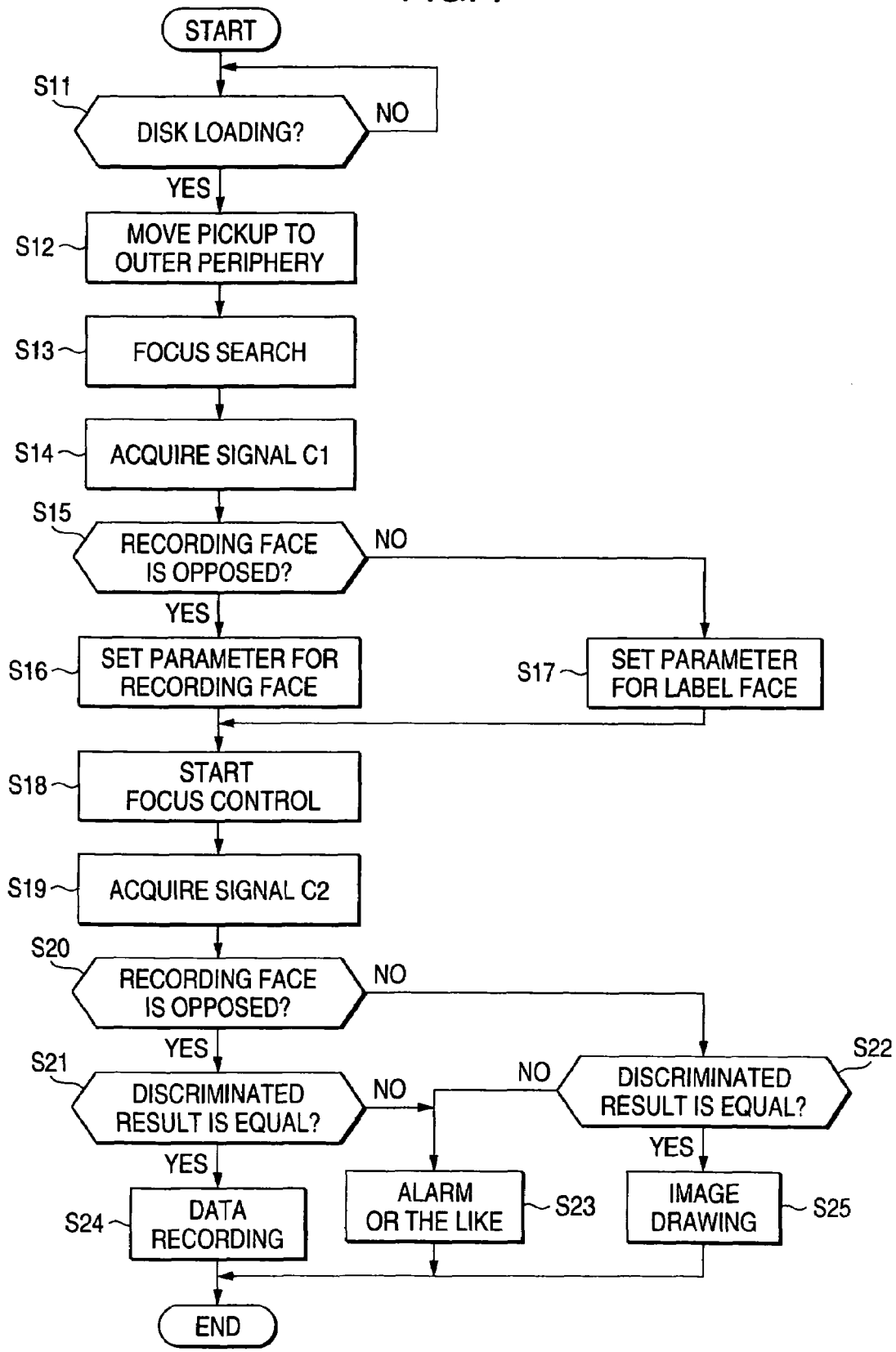
FIG. 7 is a flowchart explaining an operation of the optical disk drive.

Next, an operation of the optical disk drive 10 according to the present embodiment will be explained hereunder. FIG. 7 is a flowchart explaining the operation of the optical disk drive 10.

Here, in this operation, the discrimination of the disk face executed prior to the data recording operation or the image forming operation will be explained mainly hereunder. Since the data reproducing operation, etc. are similar to the related art, their explanation will be omitted herein.

First, the control portion 130 discriminates whether or not the optical disk 200 is loaded (step S11). If the optical disk 200 is not loaded, the control portion 130 stands by until the optical disk 200 is loaded. If the optical disk 200 is loaded, the control portion 130 causes the stepping motor 146 to rotate and the pickup 100 to move to the outer peripheral portion of the optical disk 200 (step S12).

In this stage, the control portion 130 has not grasped which one of the recording face or the label face of the optical disk 200 is opposed to the pickup 100. Incidentally, the focus control to position the focusing spot onto the reflecting layer 203 must be carried out in either case that the recording face is opposed to the pickup 100 or that the label face is opposed to the pickup 100. For that purpose, first the focusing spot must be positioned in vicinity of the reflecting layer 203. Therefore, the control portion 130 controls respective portions to execute a focus search (step S13).

In more detail, the control portion 130 firstly supplies the driving signal Li corresponding to a servo level to the write signal generator 186, secondly supplies a target value of the rotational speed to the servo circuit 144, thirdly instructs the search signal generator 160 to generate the triangular wave signal Fs, and fourthly instructs the S-curve acquiring portion 162 to close the interlocking switches S1, S2 between b-c respectively. As a result, the laser beam is emitted from the pickup 100 at a servo level whose an intensity does not discolor both the recording layer 202 and the discolored layer 205, the loaded optical disk 200 is rotated at a target rotational speed by the spindle motor 140, the objective lens 114 moves up and down in response to the voltage of the triangular wave signal Fs, and the focus error signal Fe is output from the calculation circuit 152. In this condition, the control portion 130 instructs the S-curve acquiring portion 162 to acquire the S curve.

Now, the S curve is an S-shaped waveform that appears, as shown in FIG. 8, when the focusing spot of the laser beam passes through near the reflecting layer 203 of the optical disk 200 under the situation that the objective lens 114 fluctuates vertically at the time of focus search. It is appreciated that normally the objective lens 114 is at its proper position when the focus error signal Fe crosses the zero point Z in the S curve. However, it has been confirmed experimentally by the inventors of the present invention that the focus error signal Fe shows the S-like shape only when the recording face is opposed to the pickup 100, and that the focus error signal Fe is distorted and one large peak and one small peak appear, as shown in FIG. 8, when the label face is opposed to the pickup 100.

In this manner, the reason why the waveform profile of the focus error signal Fe is differentiated largely between when the recording face is opposed and when the label face is opposed may be considered roughly as follows.

That is, in the optical disk 200 such as CD, as shown in FIG. 4, a distance from a surface of the recording face to the reflecting layer 203 is about 1.2 mm whereas a distance from a surface of the label face to the reflecting layer 203 is about 0.02 mm and is extremely short, which gives the largely different optical paths of the laser beam. For this reason, if the laser beam is applied to the label face side by using the pickup 100 that is properly designed to position the focusing spot of the laser beam incident from the recording face side at the reflecting layer 203 (recording layer 202), the S curve is distorted due to the astigmatism.

Further, the refractive index of polycarbonate that is widely used as the protection layers 201, 204, 206 is "1.5". Therefore, in the case that the laser beam is applied to the label face, an optical path length corresponding to the distance 1.2 mm and the refractive index 1.5 of the protection layer 201 is eliminated with respect to the laser beam emitted from the outer periphery side of the objective lens 114. On the other hand, in contrast to the laser beam emitted from the outer periphery side of the objective lens 114, the laser beam emitted from the center (inner periphery) side of the objective lens 114 is not so reflected when such laser beam is incident on the protection layer 206. As a result, it may be concluded that optical path lengths of the laser beam emitted from the outer periphery side and the inner periphery side of the objective lens 114 become different to give different focal points and consequently two S curves appear.

Accordingly, the S-curve discriminating portion 164 discriminates that the recording face is opposed if the S curve acquired by the S-curve acquiring portion 162 has simply a peak point equivalent to the maximum value and a bottom point equivalent to the minimum value, for example, while discriminates that the label face is opposed if the S curve has a pair of a peak point equivalent to the maximal point and a bottom point equivalent to the minimal point, both being smaller in magnitude than the maximum value and the minimum value respectively, before or after a pair of the peak point equivalent to the maximum value and the bottom point equivalent to the minimum value, and then supplies the signal C1 indicating the discriminated result to the control portion 130. The control portion 130 acquires the signal C1 (step S14).

Therefore, the control portion 130 at this stage can discriminate which one of the recording face and the label face of the optical disk 200 is opposed to the pickup 100, at the time of focus search.

In this case, the reason for that the S curve is acquired by applying the laser beam while moving the pickup 100 toward the outer peripheral portion of the optical disk 200 is given as follows. That is, if the groove 202a is present when the laser beam is applied to the recording face, the scattering of light is caused due to the unevenness, so that not only a quantity of returned light is reduced correspondingly but also such quantity of returned light becomes unstable. When the laser beam is applied to the label face side, a spot size on the reflecting layer 203 tends to enlarge according to the difference of focal points due to the above-mentioned astigmatism. Hence, if the groove 202a is present, a component of the laser beam reflected by the inner side surface is superposed on the focus error signal Fe as a noise component and exerts a bad influence upon a profile recognition of the waveform.

Therefore, if the groove 202a is not present but the reflecting layer 203 is present, the focus search maybe carried cut by using not only the outer peripheral side of the optical disk 200 but also the area on the inner peripheral side.

Then, the control portion 130 discriminates based on the acquired signal C1 which one of the recording face and the label face is opposed (step S15). If the control portion 130 discriminates that the recording face is opposed, a parameter for the recording face is set in the loop filter 154 (step S16) On the other hand, if the control portion 130 discriminates that the label face is opposed, a parameter for the label face is set in the loop filter 154 (step S17).

Then, the control portion 130 instructs the S-curve acquiring portion 162 to close the interlocking switches S1, S2 between a-c respectively when the focus error signal Fe crosses the zero point Z in the S curve that appears after the S curve used in the discrimination of the disk face (step S18).

A time point when the focus error signal Fe crosses the zero point Z in the S curve corresponds to a time point when the objective lens 114 that is fluctuating vertically is just at a proper position, as described above. Therefore, if the interlocking switches S1, S2 are closed between a-c at this time point respectively, a feed-back loop for the focus control is formed. In addition, since the servo parameter corresponding to the disk face is set in the loop filter 154 in above step S15 or S16, the focus actuator 121 is driven subsequently by the focus driving signal Fc that acts to cancel the focus error. As a consequence, the focus control is carried out.

Then, the control portion 130 acquires the signal C2 to discriminate again which one of the recording face and the label face is opposed, after the start of the focus control (step S19).

Figure 9A:
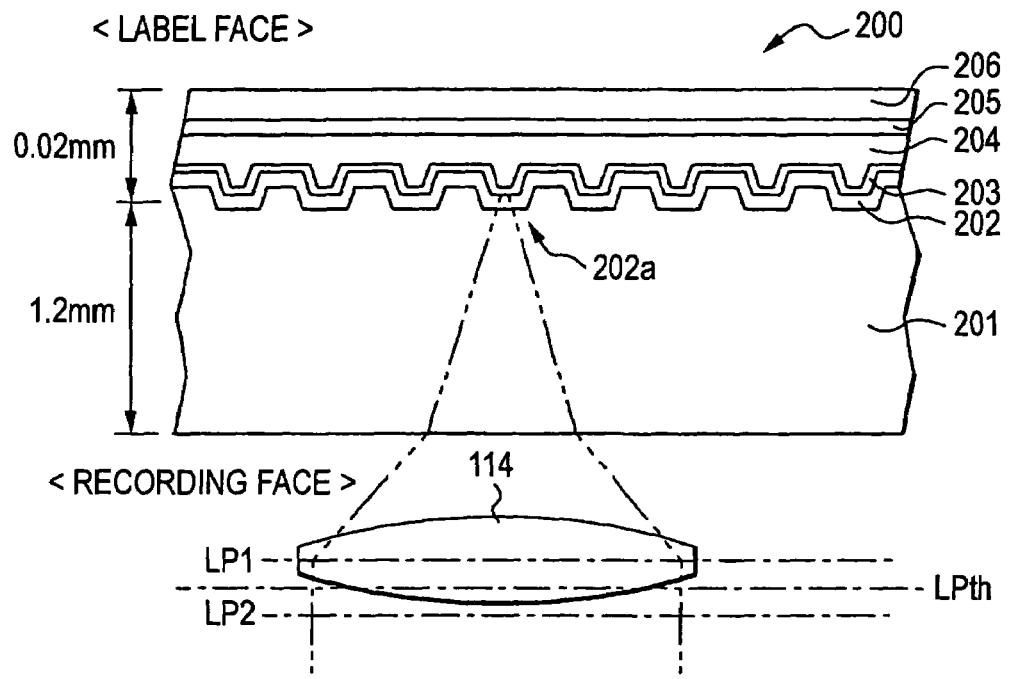
FIGS. 9A and 9B are views explaining the principle of disk face discrimination respectively when focus control is applied in the optical disk drive.
Figure 9B:
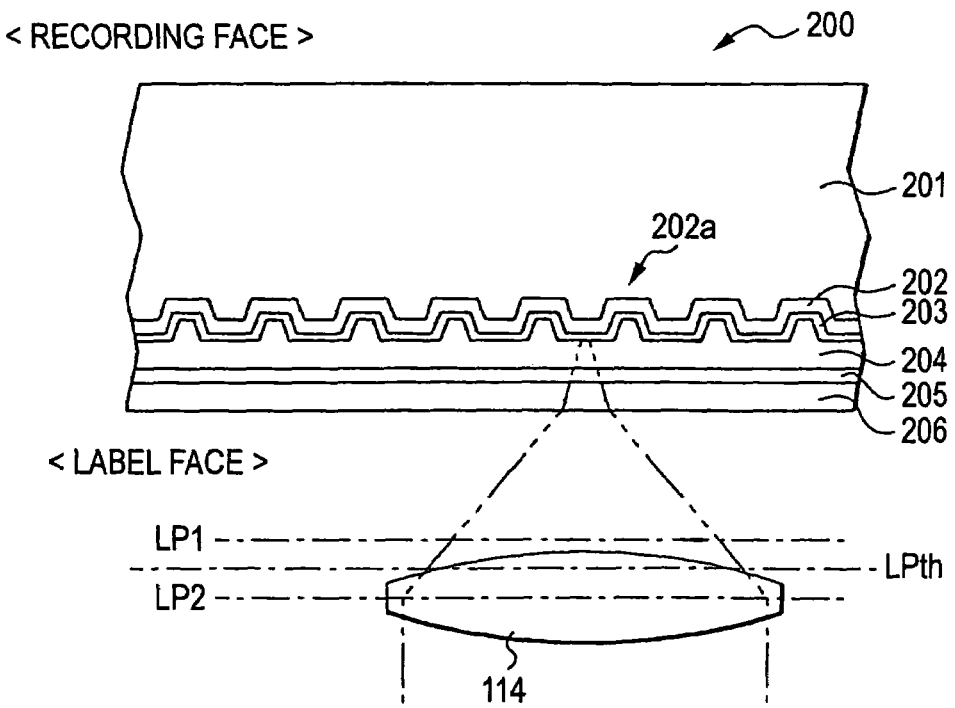

As described above, in the optical disk 200 such as CD, as shown in FIG. 4, a distance from a surface of the recording face to the reflecting layer 203 is about 1.2 mm whereas a distance from a surface of the label face to the reflecting layer 203 is about 0.02 mm and is extremely short, which can be neglected. Therefore, a position LP2 of the objective lens 114 (see FIG. 9B) that is subjected to the focus control when the laser beam is applied to the label face side is positioned lower than a position LP2 of the objective lens 114 (see FIG. 9A) that is subjected to the focus control when the laser beam is applied to the recording face side. The position of the objective lens 114 under the focus control is defined by the voltage of the focus driving signal Fc. However, since actually such position is varied finely, it is not proper to use this position as it is. Therefore, if the voltage of the focus driving signal Fc is smoothed by the low-pass filter 156, a smoothed voltage indicates an average value of the position of the objective lens 114 that is subjected to the focus control (i.e., the focusing spot) on a time base.

Then, when this smoothed voltage is compared in magnitude with the threshold voltage Vth equivalent to a threshold spot LPth by the comparator 158, it can be discriminated which one of the recording face and the label face of the optical disk 200 is opposed to the pickup 100.

Concretely, the objective lens 114 comes up to the optical disk if the voltage of the focus driving signal Fc is high. Therefore, the recording face is opposed if the smoothed voltage is higher than the threshold voltage Vth (if the signal C2 is at a H level), while the label face is opposed if the smoothed voltage is lower than the threshold voltage Vth (if the signal C2 is at an L level).

In this case, when a responsibility or a precision of the focus actuator 121 to the voltage of the focus driving signal Fc is varied, the threshold voltage Vth must be corrected appropriately at the time of factory forwarding, after the power supply is turned ON, or the like.

In order to reduce the influence of the bowing of the optical disk 200, it is preferable that an average position of the objective lens 114 that is subjected to the focus control (focusing spot) on a time base should be detected after the pickup 100 is moved to the inner peripheral surface side The control portion 130 discriminates based on the acquired signal C2 which one of the recording face and the label face is opposed (step S20). If either the recording face or the label face is opposed, it is discriminated whether or not the discriminated result is equal to the previous discriminated result in step S14 (steps S21, S22).

Here, "the discriminated result is not equal to the previous discriminated result" signifies that discriminated results of the disk face at the time of focus search and at the time of focus control are different mutually. Therefore, the control portion 130 causes to eject forcedly the loaded optical disk 200 and sends out the data informing such effect to the host computer (step S23). Accordingly, a warning message is displayed on a display of the host computer, and thus the user can check whether or not the ejected optical disk is proper.

On the other hand, if the discriminated result in step S20 indicates that the recording face is opposed and the discriminated result is equal to the previous discriminated result in step S14, the control portion 130 moves the pickup 100, and tries to read a code (Start Time of Lead-In Area), which is formed on the recording face of the optical disk 200 and in which information necessary for the data recording are coded, and read the time information (ATIP information) by searching a starting point (not shown) of the spiral groove 202a respectively.

Since the focus control has already been executed at this stage, the peculiar code or the time information can be read immediately when the recording face is opposed.

Then, if the time information as well as the peculiar code can be read, it indicates correctly that the optical disk 200 is set such that the recording face is opposed to the pickup 100. Therefore, the control portion 130 discriminates the data that are supplied from the host computer. Then, if the data are the recorded data to be recorded on the optical disk 200, the control portion 130 controls respective portions to record the data by using the information indicated by the peculiar code (step S24).

Accordingly, the laser beam is applied either at a write level that discolors the recording layer 202 or at an intensity of the servo level that does not discolor the recording layer 202, and with a ratio of time lengths corresponding to the data that are recorded along the groove 202a, and thus pits 202P (see FIG. 5) are formed. In addition, when the laser beam is applied at an intensity of the servo level, power control, focus control, and tracking control of the laser beam are carried out by the returned light.

In this case, in step S24, if the data supplied from the host computer are the image formation data, the control portion 130 does not execute the data recording but sends out the data of the warning message indicating the effect to the host computer, and ends its operation.

If the discriminated result in step S20 indicates that the label face is opposed and the discriminated result is equal to the previous discriminated result in step S14, the control portion 130 tries to read the bar code (see FIG. 6) consisting of the plurality of bars 210.

Here, space portions in which no bar 210 is provided can be sensed by the returned light itself from the reflecting layer 203, while portions in which the bars 210 are provided can be sensed according to reduction in the returned light from the reflecting layer 203. For that purpose, it is a premise that the focus control was carried out. Since the focus control has already been executed at this stage, information indicated by the bar code can be read immediately when the label face is opposed.

Then, if the bar code can be read, it indicates correctly that the optical disk 200 is set such that the label face is opposed to the pickup 100. Therefore, the control portion 130 discriminates the data supplied from the host computer. Then, if such data are the data applied to form the image on the label face, the control portion 130 controls respective portions to form the image by using the information indicated by the bar code (step S25).

Figure 10:
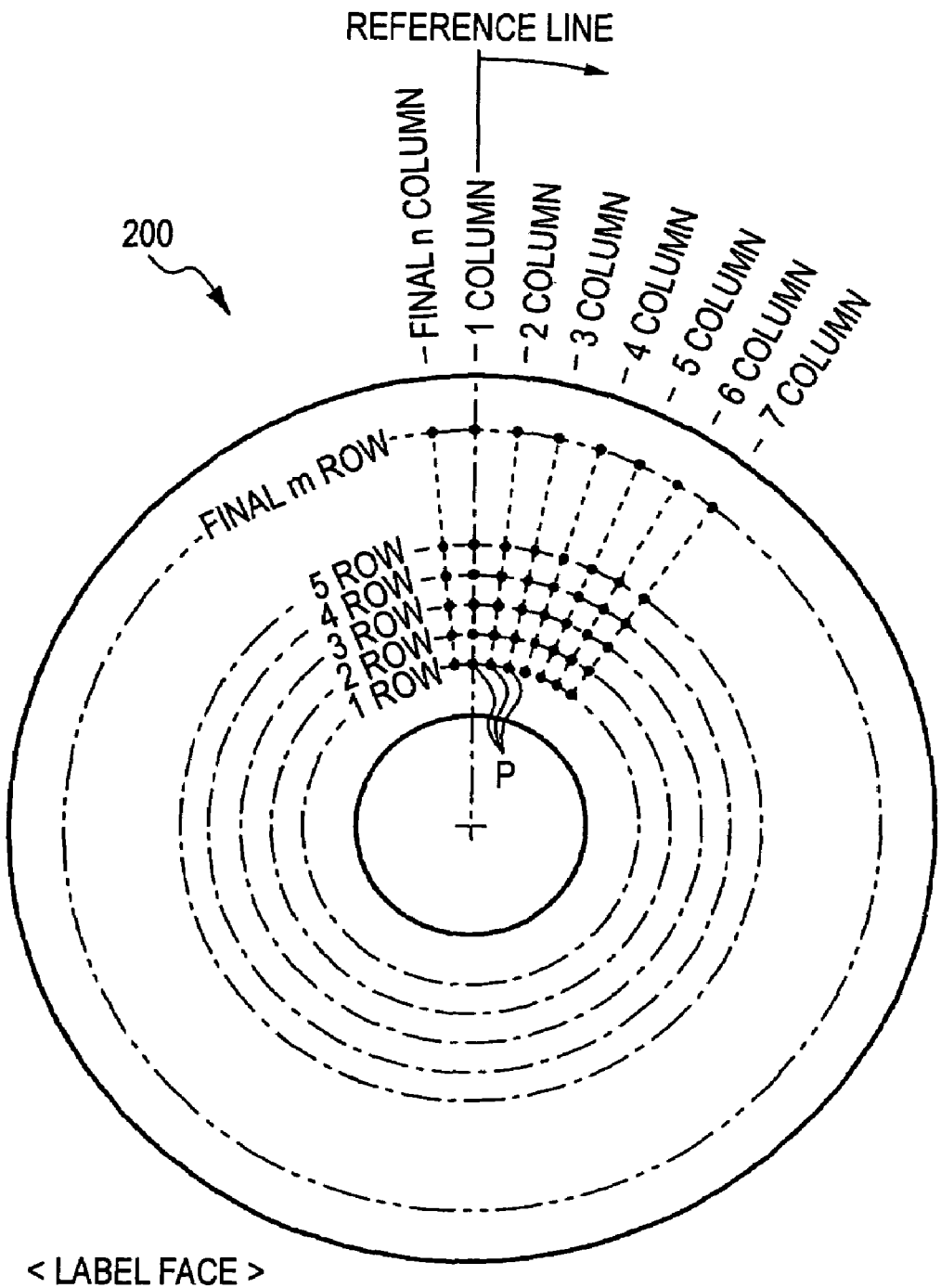
FIG. 10 is a view explained an operation of forming an image by the optical disk drive.

Now, assume that a coordinate system of dots P of the image to be formed on the label face of the optical disk 200 is defined as shown in FIG. 10, the main scanning of the label face is executed by the rotation of the optical disk 200 and the sub-scanning is executed by feeding the pickup 100 every row. Then, the laser beam is applied according to a density of dots P corresponding to the scanned spot, and the image is formed. In addition, if the laser beam is applied at an intensity of the servo level, the power control and the focus control of the laser beam are executed based on the returned light. However, in this embodiment, since the sub-scanning is executed by the feed of the pickup 100, the tracking control in the data recording is not executed.

In this case, in step S25, if the data supplied from the host computer are the recording data to be recorded on the recording face, the control portion 130 does not execution the image formation but sends out the data of the warning message indicating the effect to the host computer, and ends its operation.

In this manner, in the optical disk drive according to the first embodiment, when the optical disk 200 is loaded to record the data or form the image, it is discriminated at the time of focus search and at the time of focus control respectively which one of the recording face and the label face is opposed, and then the data recording or the image formation is carried out only if twice discriminated results coincide with each other. Hence, even though the user sets the recording face in error to oppose to the pickup, for example, so as to form the image, it can be discriminated exactly by the optical disk drive 10 side that the recording face is set. As a result, the destruction of recorded data caused by applying the laser beam at a write level onto the recording face again, etc. can be prevented beforehand.

In this first embodiment, the peculiar code and the time information formed on the recording face are used to check that the recording face is opposed. In this case, if these information can be read in the focus control state, it may be decided that the recording face is opposed.

Similarly, the bar code formed on the label face is used to check the label face is opposed. In this case, if the bar code can be read by scanning the bar code area in the focus control state, it may be decided that the recording face is opposed.

In other words, according to the reading of the peculiar code/time information or the reading of the bar code in place of the discrimination of the position by the objective lens 114 in step S18, it may be discriminated which one of the recording face and the label face is opposed.

Of course, discrimination of the disk face based on the S curve waveform may be applied before this discrimination.

Now, in both cases the bar code is used to check/discriminate that the label face is opposed, an upper limit must be set to a width of the bar code 210. The reason for this that, if a width of the bar code 210 is set too thick, a period during which the returned light is reduced is continued correspondingly and thus the focus control executed by detecting the returned light cannot be maintained. Hence, it is preferable that, for example, the width of the bar code 210 should be set to less than a width, which is decided by a rotational speed in the bar code scanning, and constant and the information should be coded by using a magnification indicating how large a width of the space portion is set with respect to a width of the bar code 210 and a transition timing from the space portion to the bar 210 (This technology is described in detail in Patent Application No. 2002-222074 proposed by the same inventors of this application, the contents of which are incorporated herein by references).

Figure 11:
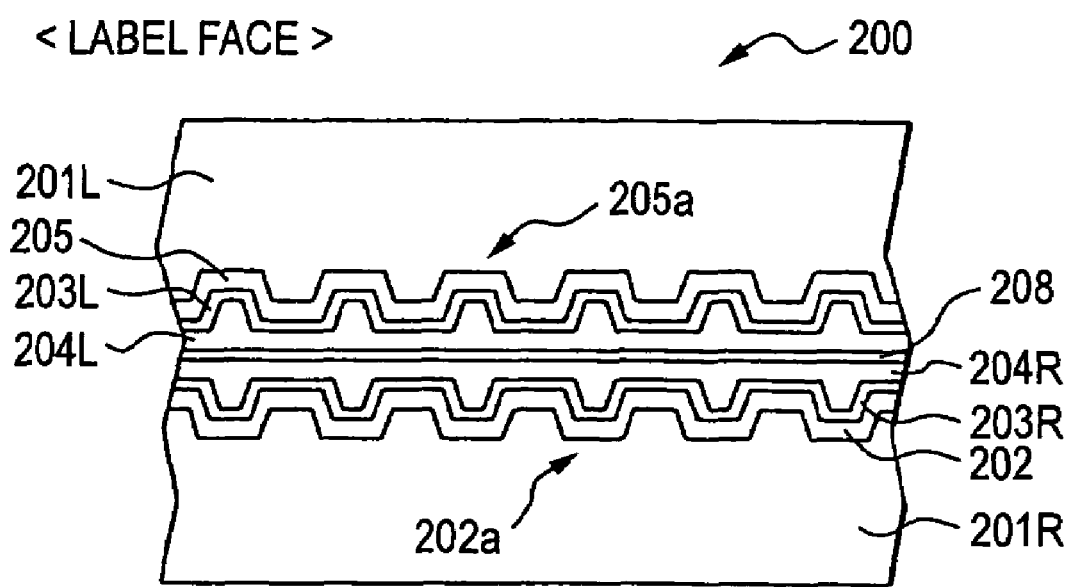
FIG. 11 is a schematic sectional view showing a configuration of the optical disk that can be applied to the optical disk drive.

In place of provision of the bar code on the label face to check/discriminate that the label face is opposed, the similar grooves to those on the recording face may be provided on the label face. FIG. 11 is a schematic sectional view showing a configuration of such optical disk 200. As shown in FIG. 11, the optical disk 200 is constructed by adhering a single-faced disk, which has a protection layer 201R, the recording layer 202, a reflecting layer 203R, and a protection layer 204R sequentially when viewed from the recording face, and a single-faced disk, which has a protection layer 201L, the discolored layer 205, a reflecting layer 203R, and a protection layer 204F sequentially when viewed from the recording face, with an adhesive layer 208.

Then, similarly to the grooves 202a on the recording layer 202, grooves 205 are formed in the discolored layer 205 so as to wobble. Then, if this wobbling is demodulated, the identification information indicating the label face can be obtained.

Accordingly, when the laser beam is applied in the state that the focus control was applied, it is feasible to check/discriminate that the recording face is opposed if the grooves 202a can be sensed and the time information can be obtained by demodulation the wobbling state. Otherwise, it is feasible to check/discriminate that the label face is opposed if the grooves 205a can be sensed and the identification information indicating the label face can be obtained by demodulation the wobbling state.

Of course, the discrimination of the disk face based on the S-curve waveform may also be used before the discrimination executed demodulation the wobbling states of the grooves 202a, 205a.

In this case, in the first embodiment, when the image is formed on the label face of the optical disk 200, as shown in FIG. 4, the sub-scanning is executed simply by the feed of the pickup 100 while neglecting the groves 202a. In this case, even when the optical disk 200 is set such that the label face is opposed to the pickup 100, in some case the tracking control can be executed by sensing the grooves 202a (strictly speaking, lands 202b because positional relationships between the unevennesses are reversed).

In particular, in the present embodiment, since it is discriminated which one of the recording face and the label face is opposed to the pickup 100 and then the servo parameter is set according to the discriminated result, such possibility is enhanced. In such case, the image may be formed by applying the tracking control, which utilizes the returned light from the grooves 202a (lands 202b), while controlling the irradiation position of the laser beam.

In order to trace the groove 202a (land 202b), which is formed to spiral clockwise from the inner periphery side as a starting point when viewed from the recording face, from the label face, a necessity to reverse the rotating direction of the optical disk 200 is generated. In this case, if the groove 202a is traced from the outer periphery side of the optical disk 200 to the inner periphery side, the rotating direction of the optical disk 200 can be kept in the same direction.

The image formation using such tracking control is not limited to the optical disk shown in FIG. 4, and is effective particularly in the optical disk shown in FIG. 11.

Second Embodiment

Next, an optical disk drive according to a second embodiment of the present invention will be explained hereunder.

Figure 12:
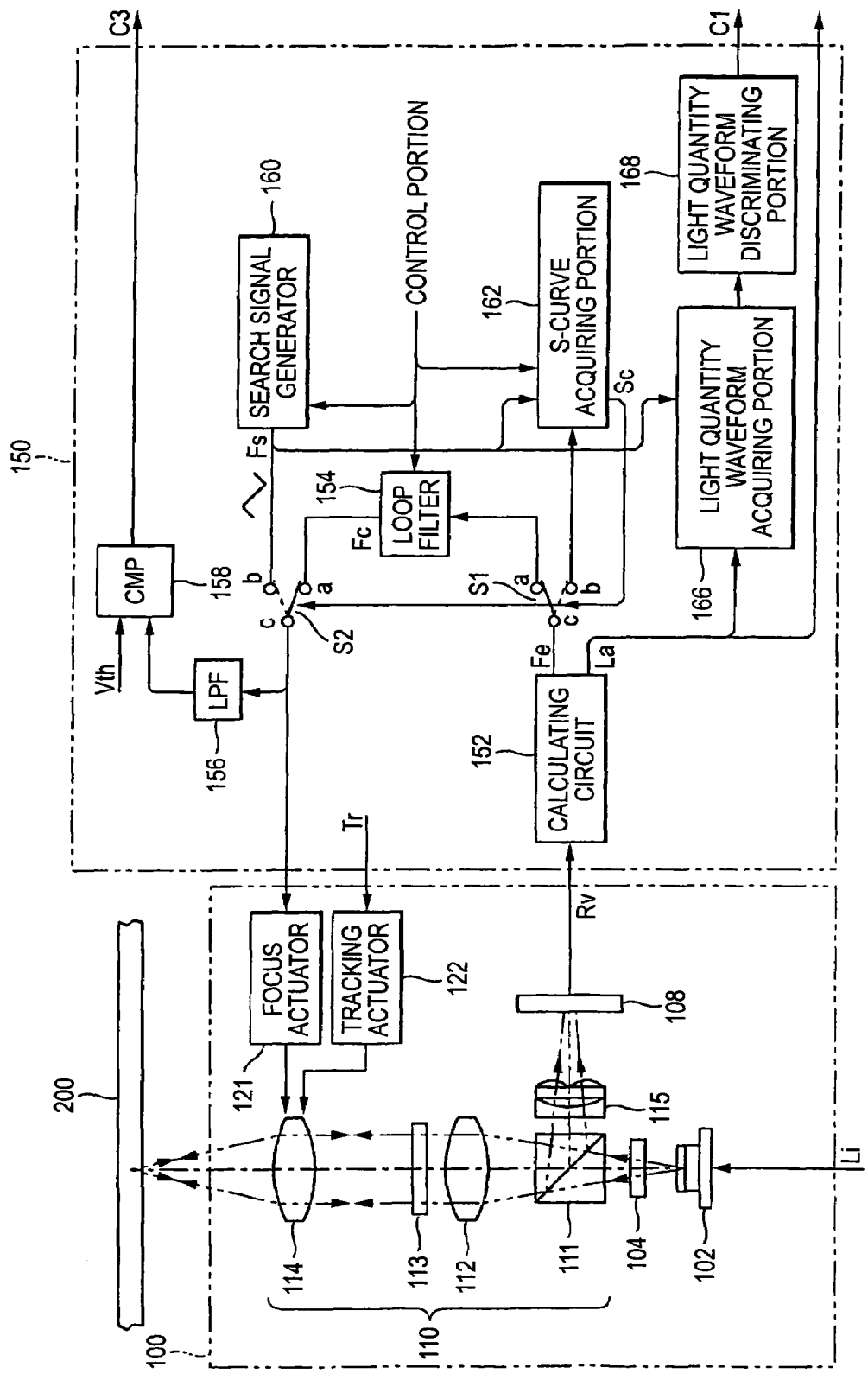
FIG. 12 is a block diagram showing a configuration of an optical disk drive according to a second embodiment of the present invention.

In the first embodiment, it is discriminated based on the S-curve profile of the focus error signal Fe at the time of focus search which one of the recording face and the label face is opposed. In the second embodiment, it is discriminated based on the waveform profile of the light quantity signal La which one of the recording face and the label face is opposed. FIG. 12 is a block diagram showing a configuration of the optical disk drive according to the second embodiment. In the configuration shown in FIG. 12, an light quantity waveform acquiring portion 166 and an light quantity waveform discriminating portion 168 are provided, but the S-curve discriminating portion 164 shown in FIG. 2 is not present.

The light quantity waveform acquiring portion 166 acquires a waveform of the light quantity signal La at the time of focus search. Here, in the situation that the objective lens 114 moves up and down at the time of focus search, the waveform of the light quantity signal La is given as shown in FIG. 8 when the focusing spot of the laser beam passes through near the reflecting layer 203 of the optical disk 200. In more derail, the waveform of the light quantity signal La obtained when the label face is opposed is distorted asymmetrically due to the above astigmatism, has a low peak point, and has a narrow foot portion, in comparison with the waveform obtained when the recording face is opposed.

Therefore, for example, if it is discriminated by setting an appropriate threshold value whether or not the light quantity signal La exceeds the threshold value, if a width of a period in which the light quantity signal La exceeds a slice level is sensed by setting the appropriate slice level and a positional relationship with respect to the peak point (whether or not the light quantity signal La is bilaterally symmetrical) is discriminated, etc., the light quantity waveform discriminating portion 168 can discriminate which one of the recording face and the label face of the optical disk 200 is opposed to the pickup 100. Then, the control portion 130 can discriminate the discriminated result of the light quantity waveform discriminating portion 168 based on the signal C1 indicating the discriminated result.

Of course, the average position of the objective lens 114 on a time base and the discrimination of the disk face based on the reading of the bar code/groove, explained in the first embodiment, may be used after the discrimination of the disk face based on the light quantity waveform.

Third Embodiment

Next, an optical disk drive according to a third embodiment of the present invention will be explained hereunder.

In this third embodiment, actually the laser beam with a certain intensity is applied to the recording layer 202 or the discolored layer 205 when the focus control is being applied, and then it is discriminated based on difference in a level of discolor which one of the recording face and the label face is opposed.

Figure 13:
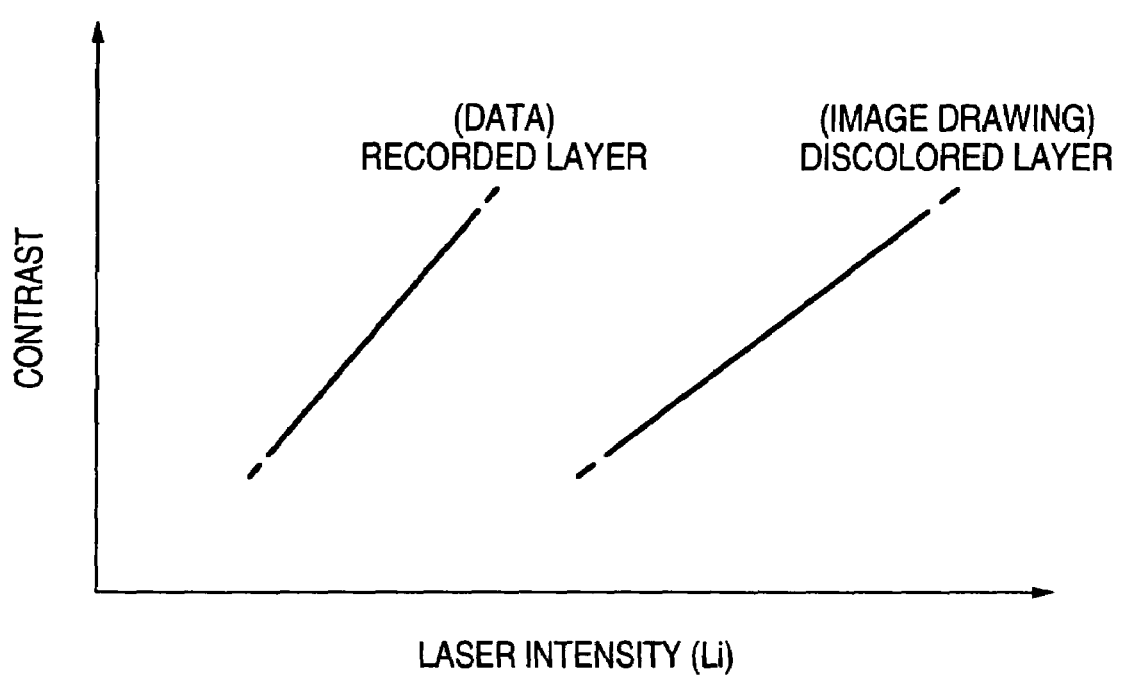
FIG. 13 is a view explaining the principle of a disk face discrimination in an optical disk drive according to a third embodiment of the present invention.

FIG. 13 is a view showing a relationship between an intensity of the laser beam and a contrast on the recording layer 202 and the discolored layer 205. The contrast used herein means a level indicating to what extent the layer is discolored when the laser beam is applied at a certain intensity, in contrast to the case the laser beam is not applied.

As described above, the spot size tends to increase when the laser beam is applied from the label face side, and correspondingly the intensity per unit area of the discolored layer 205 is lowered. Therefore, if the same contrast is needed on both the recording layer 202 and the discolored layer 205, the higher intensity is required when the laser beam is applied to the discolored layer 205 from the label face side, in contrast to the case the laser beam is applied to recording layer 202 from the recording face side.

As a result, if the laser beam at a certain write level is applied to the recording layer 202 or the discolored layer 205 and then the contrast is acquired from the light quantity signal La indicating its returned light in the situation that the focus control is applied, the control portion 130 can discriminate that the layer to which the laser beam is applied is the recording layer 202 based on the fact that the recording face is opposed or that the layer to which the laser beam is applied is the discolored layer 205 based on the fact that the label face is opposed.

In this case, the disk face may be discriminated by using the laser beam intensity and a β value in place of the laser beam intensity and the contrast. Here, assume that the pit is formed by applying the laser beam at a certain intensity, a peak level (where a sign is plus) of the EEFM reproduced signal obtained when this pit is reproduced is j and a bottom level (where a sign is minus) is k, the β value is obtained by (j+k)/(j−k). It is possible to say that the β value is an index indicating quality of the pit.

In this case, the control portion 130 may supply the target value corresponding to the write level to the write signal generator 186 to apply the laser beam at a certain write level, and change in the amplitude of the light quantity signal La may be discriminated to acquire the contrast, and peak/bottom points of the EEFM reproduced signal may be detected to acquire the β value.

Of course, the discrimination of the disk face based on the profile of the S curve explained in the first embodiment or the discrimination of the disk face based on the waveform profile of the light quantity signal La explained in the second embodiment may be used before such discrimination of the disk face.

As described above, according to the present invention, it is possible to discriminate precisely and directly which one of the recording face, on which the data can be recorded, and the label face, on which the image is formed, of the optical disk is opposed to the pickup.

The entire content of Priority Document No. 2002-377879 is incorporated herein by reference.

What is claimed is:

1. An optical disc apparatus that recognizes a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surface of the recording side and the label side;

a focusing unit which drives an objective lens along the optical axis for focusing the laser beam at a focal point;

a focus searching unit which control the focusing unit so that the focal point moves up and down in a predetermined range;

an error signal outputting unit which outputs a focus error signal indicating in which direction and to what extent the focal point is deviated from the reflective layer of the optical disk; and a discriminating unit which acquires a S-curve waveform of the focus error signal that appears when the focal point of the laser beam passes through the reflective layer due to up and down motion of the focal point, and discriminates the recording side faces toward the irradiating unit when the S-curve waveform in the focus error signal is a single S curve waveform and discriminates the label side faces the irradiating unit when the S-curve waveform in the focus error signal is a double S curve waveform.

2. The apparatus according to claim 1, wherein, after an irradiation spot of the laser beam is moved to an area in which the reflective layer is formed but no groove is formed, the focus searching unit controls the focusing unit.

3. An optical disk apparatus that recognize a surface of an optical disk as a recording side or a label side, which optical disk includes a recording layer on which a groove is formed toward the recording side, a reflective layer positioned between surfaces of the recording side and the label side and provided closer to the surface of the label side than the other, and a discolorable layer which may be discolored by heat or light and provided on the label side, the apparatus comprising:

an irradiating unit which irradiates, with a laser beam, one of the surfaces of the recording side and the label side;

a focusing unit which drives an objective lens along the optical axis for focusing the laser beam at a focal point;

a focus searching unit which control the focusing unit so that the focal point moves up and down in a predetermined range;

a sensing unit which senses return light, which is reflected by the reflective layer, among the laser beam applied by the irradiating unit; and a discriminating unit which acquires a S-curve waveform of a signal indicating an amount of the return light that appears when the focal point of the laser beam passes through the reflective layer due to up and down motion of the focal point, and discriminates the recording side faces toward the irradiating unit when the S-curve waveform in the focus error signal is a single S curve waveform and discriminates the label side faces the irradiating unit when the S-curve waveform in the focus error signal is a double S curve waveform.

4. The apparatus according to claim 3, wherein, after an irradiation spot of the laser beam is moved to an area in which the reflective layer is formed but no groove is formed, the focus searching unit controls the focusing unit.

5. An optical disk apparatus that recognizes a surface of an optical disk as a recording side or a label side, which optical disk includes a recording area on which a groove is formed on the recording side, a reflective area and a discolorable area both provided on the label side, the discolorable area being discolored by heat or light, the apparatus comprising:

an irradiating unit which irradiates, with a laser beam, one of the surfaces of the recording side and the label side;

a focusing unit which drives an objective lens along the optical axis for focus controlling the laser beam at a focal point;

a focus searching unit which controls the focusing unit so that the focal point moves up and down in a predetermined range;

a sensing unit which senses return light, which is reflected by the reflective area, among the laser beam applied by the irradiating unit; and a discriminating unit which acquires a S-curve waveform of a signal indicating an amount of the return light that appears when the focal point of the laser beam passes through the reflective area due to up and down motion of the focal point, and discriminates the recording side faces toward the irradiating unit when the S-curve waveform in the focus error signal is a single S curve waveform and discriminates the label side faces the irradiating unit when the S-curve waveform in the focus error signal is a double S curve waveform.

6. The apparatus according to claim 5, wherein, after an irradiation spot of the laser beam is moved to an area in which the reflective area is formed but no groove is formed, the focus searching unit controls the focusing unit.

7. A method of recognizing a surface of an optical disk as a recording side of a label side, which optical disk includes a recording area on which a groove is formed on the recording side, a reflective area and a discolorable area both provided on the label side, the discolorable area being discolored by heat or light, the method comprising:

irradiating, with a laser beam, one of the surfaces of the recording side and the label side;

driving an objective lens along the optical axis for focus controlling the laser beam at a focal point;

controlling the focusing unit so that the focal point moves up and down in a predetermined range;

sensing return light, which is reflected by the reflective area, among the laser beam applied by the irradiating unit;

acquiring a S-curve waveform of a signal indicating an amount of the return light that appears when the focal point of the laser beam passes through the reflective area due to up and down motion of the focal point; and discriminates the recording side faces toward the irradiating unit when the S-curve waveform in the focus error signal is a single S curve waveform and discriminates the label side faces the irradiating unit when the S-curve waveform in the focus error signal is a double S curve waveform determining whether the side of the optical disk facing toward the irradiating unit is the recording side or the label side by recognizing predetermined features of the waveform recognizing whether the waveform corresponds to a waveform that is acquired in a case when the recording side faces toward the irradiating unit or corresponds to a waveform that is acquired in a case when the label side faces toward the irradiating unit.

8. The method according to claim 7, wherein, after an irradiation spot of the laser beam is moved to an area in which the reflective area is formed but no groove is formed, the focusing unit is controlled.

9. An optical disk system that recognizes a surface of an optical disk as a recording side or a label side, the system comprising:

an optical disk which includes a recording area on which a groove is formed on the recording side, a reflective area, a discolorable area and a bar code area provided on the label side, the discolorable area being discolored by heat or light, the bar code area having a bar code;

an irradiating unit which irradiates, with a laser beam, one of the surfaces of the recording side and the label side;

a focusing unit which drives an objective lens along the optical axis for focus controlling the laser beam at a focal point;

a focus searching unit which controls the focusing unit so that the focal point move sup and down in a predetermined range;

a sensing unit which senses return light, which is reflected by the reflective area, among the laser beam applied by the irradiating unit; and a discriminating unit which acquires a waveform of a signal indicating the return light and determines whether the side of the optical disk facing toward the irradiating unit is the recording side or the label side by recognizing predetermined features of the waveform recognizes whether the waveform corresponds to a waveform that is acquired in a case when the recording side faces toward the irradiating unit or corresponds to a waveform that is acquired in a case when the label side faces toward the irradiating unit, wherein the system further reads the bar code area of the optical disk when the discriminating unit recognizes corresponds to a waveform that is acquired in a case when the label side faces toward the irradiating unit.

10. The optical disc apparatus according to claim 1, wherein the discriminating unit acquires the S-curve wave form of the focus error signal, and discriminates that the recording face is opposed if the S curve has simply a peak point equivalent to a maximum value and a bottom point equivalent to a minimum value and discriminates that the label face is opposed if the S curve has a pair of a peak point equivalent to a maximal point and a bottom point equivalent to a minimal point, both being smaller in magnitude than the maximum value and the minimum value respectively, before or after a pair of the peak point equivalent to the maximum value and the bottom point equivalent to the minimum value.

11. The optical disc apparatus according to claim 3, wherein the discriminating unit sets a predetermined threshold value, and discriminates that the recording face is opposed if the signal indicating the amount of the return light exceeds the threshold value and discriminates that the label face is opposed if the signal indicating the amount of the return light does not exceed the threshold value.

12. The optical disc apparatus according to claim 3, wherein the discriminating unit sets a predetermined slice level, senses a width of a period in which the signal indicating the amount of the return light exceeds the sliced level and discriminates a positional relationship with respect to a peak point of the waveform to discriminate which one of the recording face and the label face is opposed.

13. The optical disc apparatus according to claim 1, wherein the discriminating unit determines whether the side of the optical disk facing toward the irradiating unit is the recording side of the label side by comparing magnitudes of peak points on an S-curve waveform.

* * * * *